Patented July 5, 1932

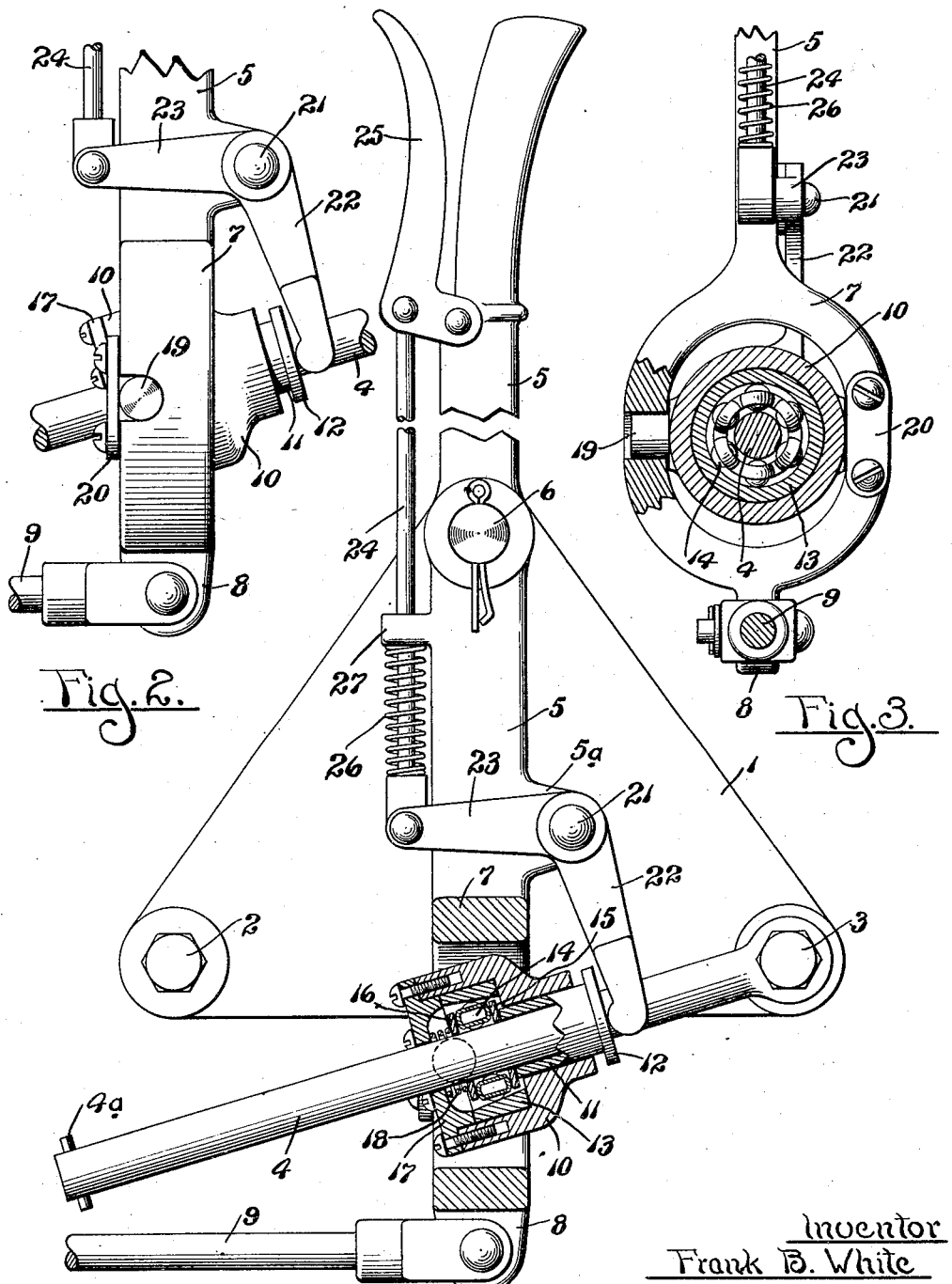

1,866,244

UNITED STATES PATENT OFFICE

FRANK B. WHITE, OF OCEAN PARK, CALIFORNIA, ASSIGNOR TO JOSEPH BERGAMO, OF SANTA MONICA, CALIFORNIA

BRAKE LEVER CONSTRUCTION

Application filed October 20, 1930. Serial No. 489,999½.

This invention relates to a brake lever construction particularly useful in connection with the emergency brake levers of automobiles, though also useful in many other relations.

The emergency brake lever in an automobile should be securely held in any position to which it is moved in setting the brake, and should be insured against undesired accidental release from such position when it has been operated to set the brake. It has been the substantially universal practice heretofore to associate an arc shaped ratchet with the brake lever, with which a dog mounted on the brake lever engages. The ratchet teeth must be small and located closely together in order that the brake lever may be pulled back to position to properly set the brake and at the same time have the dog engage with the proper tooth of the ratchet to hold the lever in position.

The ratchet and dog construction is unsatisfactory, particularly for the reason that while the ratchet has a large number of teeth, in practice one tooth only of the ratchet is made use of; or at best not more than one or two of such teeth are used. This places an excessive wear on the teeth used and the strain thereon being great, the tooth with which the dog engages becomes worn and chipped in many instances and will not serve efficiently the purpose for which it is designed, whereupon in many instances the emergency brake lever cannot be set with any degree of assurance that it will hold. If, on the other hand, the ratchet teeth are made larger and spaced farther apart it is very often impossible to draw and set the brake lever at the extreme rearward position which it should have to insure that the automobile will be held against movement.

My invention has for its primary object and purpose the provision of lever holding means which acts automatically to secure the lever in any position to which it is adjusted or moved against release for movement in the opposite direction, thereby insuring that the brake may be set as snugly or tightly as desired and that it will be positively held in the set position. A further object and purpose of the invention is to provide a construction which eliminates completely ratchet teeth and dogs engaging therewith and provides a construction which is not subject to wear and deterioration but one which will operate effectively for an indefinite period. Other objects and purposes of the invention, as will appear as understanding of the invention is had, provide a novel specific construction of brake lever assembly which may be quickly and readily installed in automobiles and which is economical to produce and durable and effective in service.

The invention is fully described in the following description taken in connection with the accompanying drawing, in which, Fig. 1 is a side elevation, with parts in section, of the brake lever assembly of my invention.

Fig. 2 is a fragmentary, somewhat enlarged, side elevation of the lower part of said assembly, and Fig. 3 is a fragmentary front elevation and partial vertical section of the construction shown in Fig. 2.

Like reference characters refer to like parts in the different figures of the drawing.

The brake lever assembly illustrated includes an anchor plate or bracket 1 of substantially equilateral triangular shape, bolted at its lower corners by bolts 2 and 3 to the transmission casing of a motor vehicle, though, of course, it is apparent that it may be permanently secured to any convenient relatively fixed part of the motor vehicle. On the front bolt 3, a cylindrical rod 4 is pivotally mounted at one end, the rod extending downwardly and rearwardly, as best shown in Fig. 1. This rod has a free movement about the axis of the bolt 3. The brake lever 5 is pivotally mounted at a distance above its lower end on a stud 6 carried at the upper corner of the anchor plate or bracket 1. The lower end portion of the brake lever extends downwardly alongside of the bracket 1 and near its lower end is provided with an integral collar-like enlargement 7 with a horizontal opening therethrough from front to rear. A lug 8 extends downwardly from the lower side of the collar 7 to which the brake rod 9 is secured in the usual manner, it being understood that the brake rod extends to the rear and is connected operatively with the emergency brake on a machine for setting the same upon forward longitudinal movement of the brake rod.

A housing 10 extends through the opening in the collar 7. It is reduced in size at its rear end and has a cylindrical opening therethrough, in which a sleeve 11 is slidably mounted, terminating at its rear end in an outwardly extending annular flange 12. The rod 4 passes freely through the sleeve 11 and through the housing 10, as shown.

At its front end portion the housing 10 has a larger opening or recess made therein in which a roller bearing assembly is mounted, consisting of an outer ring 13, ball bearings 14 held by a conventional retainer within the ring 13 and around the rod 4, and two disks 15 and 16, the first being located around the rod 4 and bearing against the inner front end of the sleeve 11 while the second disk 16 is also around the rod 4 and at the opposite side of the ball retainer. The front end of the housing 10 is closed by a plate 17 through which the rod 4 passes and a coiled compression spring 18 is located around the rod between the closure plate 17 and the disk 16.

The ring 13 of the roller bearing assembly is conically tapered at its inner side so that when the balls are pressed to the rear, as they normally are by the spring 18, they are forced inward into binding engagement with the sides of the rod 4. The housing 10 is mounted on the collar 7, having oppositely extending horizontal studs 19 received in recesses at the front side of said collar and held in said recesses by short bars 20 connected to the collar and extending across the recesses, as fully shown in Fig. 2. This permits the housing to turn about a horizontal axis and adapt itself to the rod 4 as the same is moved about the axis of the bolt 3.

Lug 5a extends from the lever 5 near the upper side of the collar 7 on which a bell-crank lever is pivotally mounted at 21. The bell crank lever has a downwardly extending arm 22 forked at its lower end and engaging against the flange 12 of sleeve 11. It has a second arm 23 to which the lower end of a rod 24 is pivotally connected. Rod 24 extends upwardly along the side of the lever 5 and has a pivotal connection at its upper end to an operating handle 25, in substantially the form of the bell-crank lever, and which has a pivotal connection a short distance below the upper end of said lever 5. A coiled spring 26 around the rod 24 bearing at its upper end against a guide lug 27, integral with the lever 5 and through which the rod 24 is guided, serves normally to move said rod 24 in downward direction and move the arm 22 to permit spring 18 to move the balls 14 into engagement with the conical inner side of ring 13.

In operating the brake lever 5 to the rear it is turned about the axis of the stud 6 and the balls 14 are released with such movement and moved forwardly on the rod 4. As soon, however, as the movement stops, the balls wedge between the rod 4 and the inner conical surface of ring 13 and securely hold the lever in any position to which it is operated and hold the brake rod 9 in position to set and hold the brake in operative position. The pivotal mounting of the housing 10, together with the pivotal mounting of the rod 4, permits the movement of the housing and the roller bearing assembly within it freely on the rod. The balls, being located entirely around the rod, engage the same at a number of points and have a very secure and tight engagement therewith.

To release the balls from the rod, the handle member 25 is operated to move rod 24 vertically, whereupon the arm 22 of the bell crank lever, pressing against the flange 12, moves the sleeve 11 lengthwise of rod 4 and forces the various balls 14 away from the conical inner surface of the ring 13 thereby releasing the engagement which the balls have had with the rod 4 and permitting movement of the lever 5 to release the brake.

The construction described is very practical and efficient and with it there is no danger of the brake releasing accidentally or otherwise when it is once set. Moreover the construction is very durable and does not become inoperative by reason of damage thereto after it has been in service for a short time. The engagement of the balls around the rod provides a relatively large engaging area between the balls and the rod so that the strain on any one point on the rod or on any one ball is divided and greatly reduced.

The construction is economical to produce, as the rod is simply a case hardened mild steel rod and the ball bearing assembly is a stock article made in large quantities by manufacturers of roller and ball bearing equipment. The assembly is complete ready to be applied to a motor vehicle and substantially the only changes which have to be made for different vehicles is in the shape and size of the anchor bracket 1 and possibly some differences in the lower end of the lever 5.

The invention is defined in the appended claims and is to be considered comprehensive of all forms of structure coming within their scope.

I claim:

1. A construction of the class described comprising, a relatively fixed support, a rod pivotally mounted at one end adjacent the lower portion and to one side of said support, a lever pivotally mounted between its ends adjacent the upper portion of said support, said lever at its lower end portion including an open collar, a housing mounted on said lever within said collar, a gripping construction located within the housing including an outer conical ring and a series of balls within said ring, said rod extending through said housing and ring with the balls located around the rod, spring means tending to force the balls into gripping engagement with said ring and rod thereby normally preventing movement of the lever in one direction, and manually operable means for moving said balls in the opposite direction against said spring means to release the lever from said rod.

2. In a construction of the class described, a relatively fixed support, a rod pivotally mounted at one end adjacent the lower portion and to one side of the support, a lever pivotally mounted between its ends adjacent the upper part of said support, said lever at its lower portion including a collar with an opening therethrough, a housing mounted on said collar in said opening, a ring having a tapered inner side mounted within said housing, a sleeve slidably mounted at one end of the housing, a series of balls within said ring at the inner end of the sleeve, said rod passing freely through said sleeve and with the balls located around it and extending beyond the housing at both ends, spring means acting on the balls to wedge the same between the tapered inner side of the ring and said rod, and manually operable means mounted on the lever to engage against the outer end of said sleeve whereby the same may be moved inwardly to free said balls from their wedging engagement with said rod and ring.

3. A construction containing the elements in combination defined in claim 4, said housing having outwardly projecting horizontal studs and means for mounting the same in opposite sides of said collar whereby the housing and the elements carried thereby may turn about a horizontal axis.

4. In a construction of the class described, a relatively fixed support, a lever pivotally mounted between its ends on said support, balls carried by said lever adjacent the lower end thereof, a member of circular cross section around which said balls are located, means normally tending to grip the balls against said member and prevent movement of the lever in one direction, and manually operable releasing means on said lever for releasing the balls from the rod to free the lever for movement.

In testimony whereof I affix my signature.

FRANK B. WHITE.